United States Patent
Wilson

(10) Patent No.: US 9,764,638 B1
(45) Date of Patent: Sep. 19, 2017

(54) POWER TRANSFER UNIT HAVING AN AXLE LOCKING SYSTEM

(71) Applicant: GM GLOBAL TECHNOLOGY OPERATIONS LLC, Detroit, MI (US)

(72) Inventor: William J. Wilson, Commerce, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/058,704

(22) Filed: Mar. 2, 2016

(51) Int. Cl.
*B60K 17/354* (2006.01)
*B60K 17/348* (2006.01)
*B60K 23/08* (2006.01)

(52) U.S. Cl.
CPC .......... *B60K 17/354* (2013.01); *B60K 17/348* (2013.01); *B60K 23/08* (2013.01); *B60Y 2400/80* (2013.01); *B60Y 2400/82* (2013.01)

(58) Field of Classification Search
CPC ..... B60K 17/354; B60K 17/348; B60K 23/08
USPC .................................................. 180/245, 247
See application file for complete search history.

(56) References Cited

U.S. PATENT DOCUMENTS

| | | | | |
|---|---|---|---|---|
| 7,905,312 B2* | 3/2011 | Kato | ................... | B60K 23/0808 180/245 |
| 8,739,915 B2* | 6/2014 | Hoeck | ................... | B60K 17/35 180/245 |
| 9,022,158 B2* | 5/2015 | Mita | ...................... | B60K 17/34 180/233 |
| 9,440,533 B2* | 9/2016 | Maeda | ................. | B60K 17/354 |
| 2002/0063027 A1* | 5/2002 | Karambelas | ............ | F16D 41/08 192/35 |
| 2004/0222029 A1* | 11/2004 | Shigeta | .............. | B60K 23/0808 180/245 |
| 2012/0260758 A1* | 10/2012 | Arai | ...................... | B60K 17/348 74/405 |
| 2013/0226421 A1* | 8/2013 | Horaguchi | ........... | B60K 17/344 701/67 |
| 2016/0107523 A1* | 4/2016 | Maeda | ................. | B60K 17/354 180/245 |

* cited by examiner

*Primary Examiner* — Tony Winner
(74) *Attorney, Agent, or Firm* — Cantor Colburn LLP

(57) ABSTRACT

A power transfer unit for a front wheel drive (FWD) vehicle includes a housing, a rear wheel drive gear shaft having a first end section configured to be selectively connected to a FWD transmission, a second end section including a gear member, an intermediate drive shaft having a first end configured to be operatively connected to the FWD transmission, a second end configured to be connected to a front wheel, and an intermediate portion having a gear element. A locking member is mounted to one of the rear wheel drive gear shaft and the intermediate shaft. The locking member is selectively shiftable between a first position, wherein the intermediate drive shaft is independent of the rear wheel drive gear shaft, and a second position wherein the gear member is operatively connected to the gear element.

20 Claims, 4 Drawing Sheets

POWER TRANSFER UNIT HAVING AN AXLE LOCKING SYSTEM

FIELD OF THE INVENTION

The subject invention relates to transmissions and, more particularly, to transmissions including a power transfer unit having an axle locking system.

BACKGROUND

Many current automobiles include a front wheel drive (FWD) system in which a transmission or transaxle operatively connects front drive wheels to an engine. Vehicle architectures more frequently utilize (FWD) transmissions to improve fuel economy. Unfortunately, FWD vehicles lack an off-road capability desired by many consumers. Manufacturers can add off road capability to FWD based vehicles by adding a power transfer unit (PTU) to send speed and torque to a rear drive unit (RDU). The RDU distributes the speed and torque to rear drive wheels thereby creating an FWD based all-wheel drive (AWD) vehicle.

Additionally, manufacturers can add off road capability to rear wheel drive (RWD) vehicles by adding a transfer case to distribute speed and torque to independent front and rear axles, thereby creating a RWD based AWD or RWD based four wheel drive (4WD) vehicle. The independent front and rear axles each contain a corresponding front and rear differential. A locking mechanism can be added to either or both of the front and rear differentials to further enhance off-road performance beyond that provided by 4WD and AWD. Enhanced off-road capability may be established by locking both differentials. The RDU in a FWD based AWD vehicle contains a differential that may be similarly locked. However, the front differential is contained within a transaxle where there exists little room to package a locking mechanism. Accordingly, it is desirable to provide FWD based vehicles with the enhanced off-road capability of a 4WD and/or AWD based vehicle in order to meet consumer demands in an ever expanding off-road market.

SUMMARY OF THE INVENTION

In accordance with an exemplary embodiment, a power transfer unit (PTU) for a front wheel drive (FWD) vehicle includes a housing, a rear wheel drive gear shaft having a first end section configured to be selectively connected to a FWD transmission, a second end section including a gear member, an intermediate drive shaft having a first end portion configured to be operatively connected to the FWD transmission, a second end portion configured to be connected to a front wheel, and an intermediate portion having a gear element. A locking member is mounted to one of the rear wheel drive gear shaft and the intermediate shaft. The locking member is selectively shiftable between a first position, wherein the intermediate drive shaft is independent of the rear wheel drive gear shaft, and a second position wherein the gear member is operatively connected to the gear element selectively coupling rotation of the intermediate drive shaft and the rear wheel drive gear shaft.

In accordance with another exemplary embodiment, a drive system includes a front wheel drive (FWD) transmission having a first output operatively connected to a first front wheel a second output, and a power transfer unit (PTU) operatively connected to the FWD transmission. The PTU includes a housing, a rear wheel drive gear shaft having a first end section selectively connected to the FWD transmission and a second end section including a gear member. An intermediate drive shaft has a first end portion operatively connected to the second output, a second end portion connected to a second front wheel, and an intermediate portion having a gear element. A locking member is mounted to one of the rear wheel drive gear shaft and the intermediate drive shaft. The locking member is selectively shiftable between a first position, wherein the intermediate drive shaft is independent of the rear wheel drive gear shaft, and a second position wherein the gear member is operatively connected to the gear element selectively coupling rotation of the intermediate drive shaft and the rear wheel drive shaft.

In accordance with yet another exemplary embodiment, a motor vehicle includes a body, an engine supported in the body, and a drive system including a front wheel drive (FWD) transmission operatively connected to the engine. The FWD transmission includes a first output operatively connected to a first front wheel axle and a second output. A power transfer unit (PTU) is operatively connected to the FWD transmission. The PTU includes a housing, a rear wheel drive gear shaft having a first end section selectively connected to the FWD transmission, and a second end section including a gear member. An intermediate drive shaft has a first end portion operatively connected to the second output, a second end portion connected to a second front wheel axle, and an intermediate portion having a gear element. A locking member is mounted to one of the rear wheel drive gear shaft and the intermediate drive shaft, the locking member is selectively shiftable between a first position, wherein the intermediate drive shaft is independent of the rear wheel drive gear shaft, and a second position wherein the gear member is operatively connected to the gear element selectively coupling rotation of the intermediate drive shaft and the rear wheel drive gear shaft.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
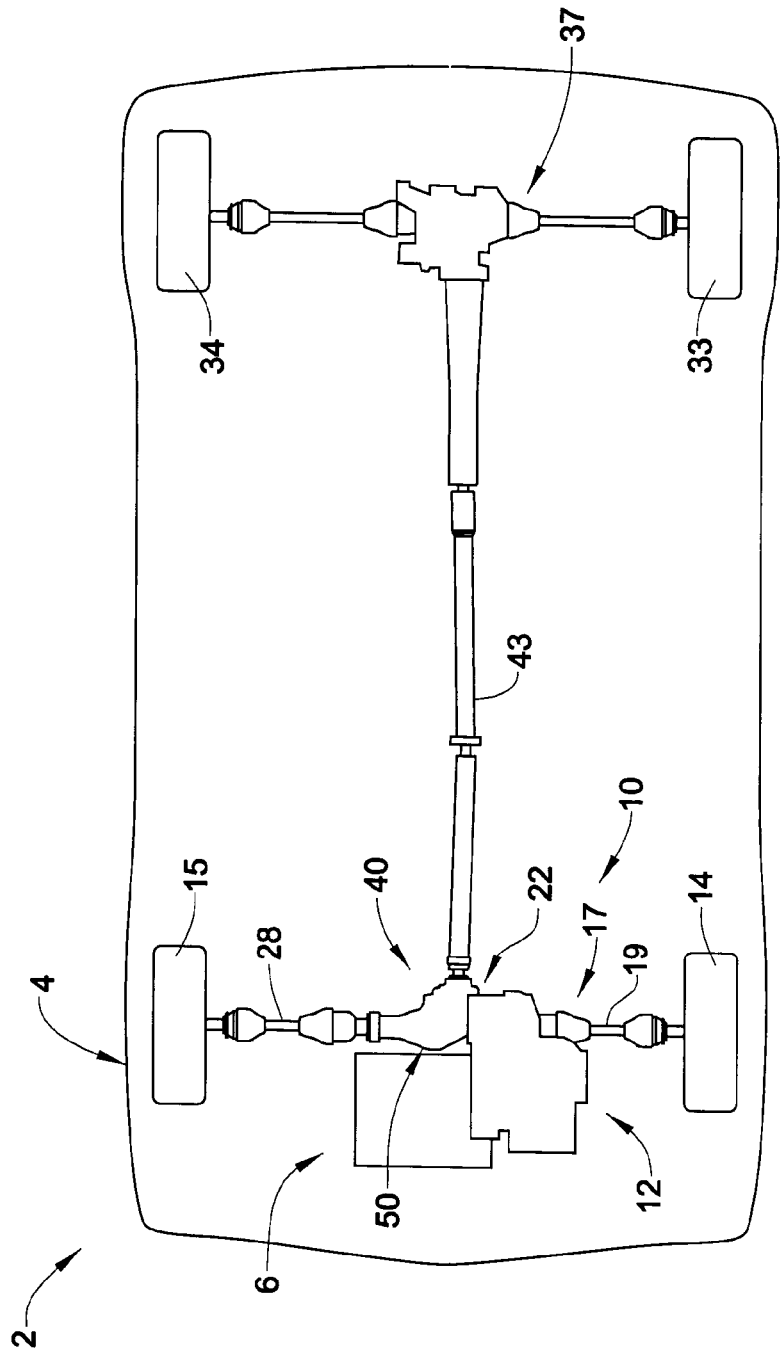
FIG. 1 depicts a motor vehicle including a power transfer unit, in accordance with an exemplary embodiment.

The following description is merely exemplary in nature and is not intended to limit the present disclosure, its application or uses. It should be understood that throughout the drawings, corresponding reference numerals indicate like or corresponding parts and features.

A motor vehicle, in accordance with an exemplary embodiment, is indicated generally at 2 in FIG. 1. Motor vehicle 2 includes a body 4 and an engine 6. Engine 6 is supported within body 4 and may take on a variety of forms. For example, engine 6 may be an internal combustion engine, a hybrid engine, or an electric motor. Motor vehicle 2 also includes a drive system 10 operatively connected to engine 6. Drive system 10 includes a front wheel drive (FWD) transmission 12. As will be detailed more fully below, front wheel drive transmission 12 drives first and second front wheels 14 and 15.

Figure 2:
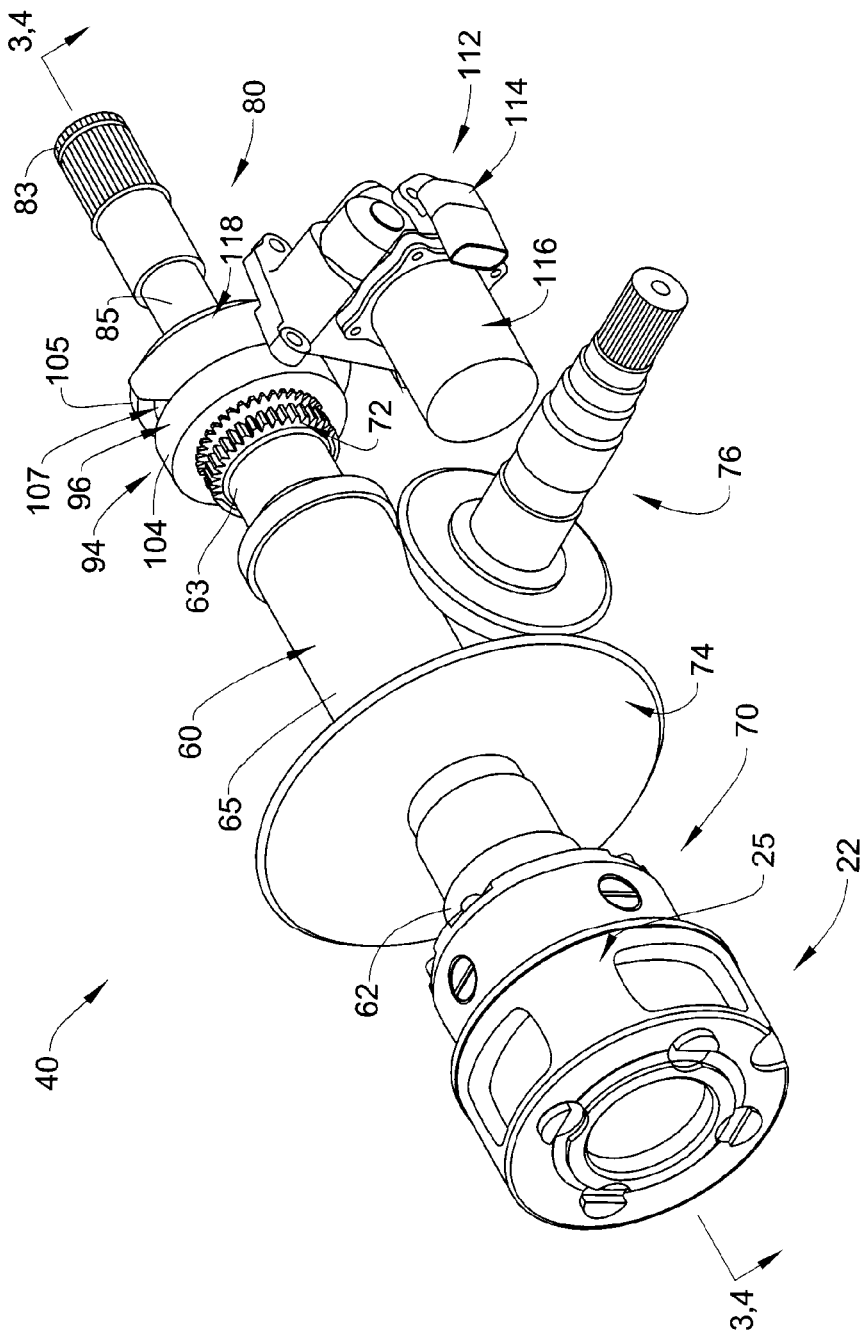
FIG. 2 depicts the power transfer unit of FIG. 1 without a housing.

FWD transmission 12 includes a first output 17 that operatively connects with first front wheel 14 through a first front half shaft 19. FWD 12 also includes a second output 22 that may take the form of a differential 25 (FIG. 2). As will also be detailed more fully below, differential 25 is operatively connected to second front wheel 15 through a second front half shaft 28. Motor vehicle 2 also includes first and second rear wheels 33 and 34. A rear drive module 37 provides an operable interface between FWD transmission 12 and first and second rear wheels 33 and 34.

Figure 3:
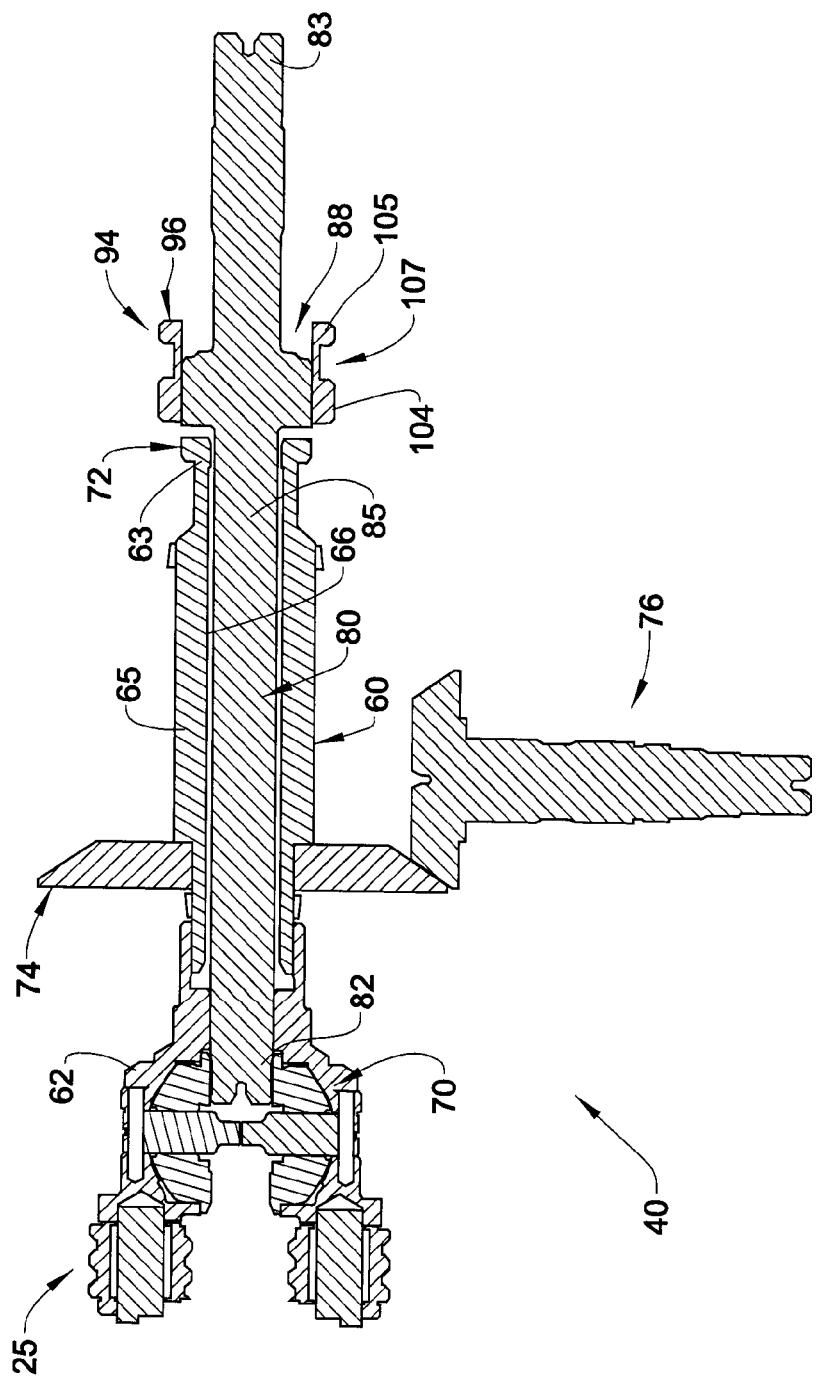
FIG. 3 depicts a partial, cross-sectional view of the power transfer unit of FIG. 2, taken along line 3-3, showing a locking member in a first position.
Figure 4:
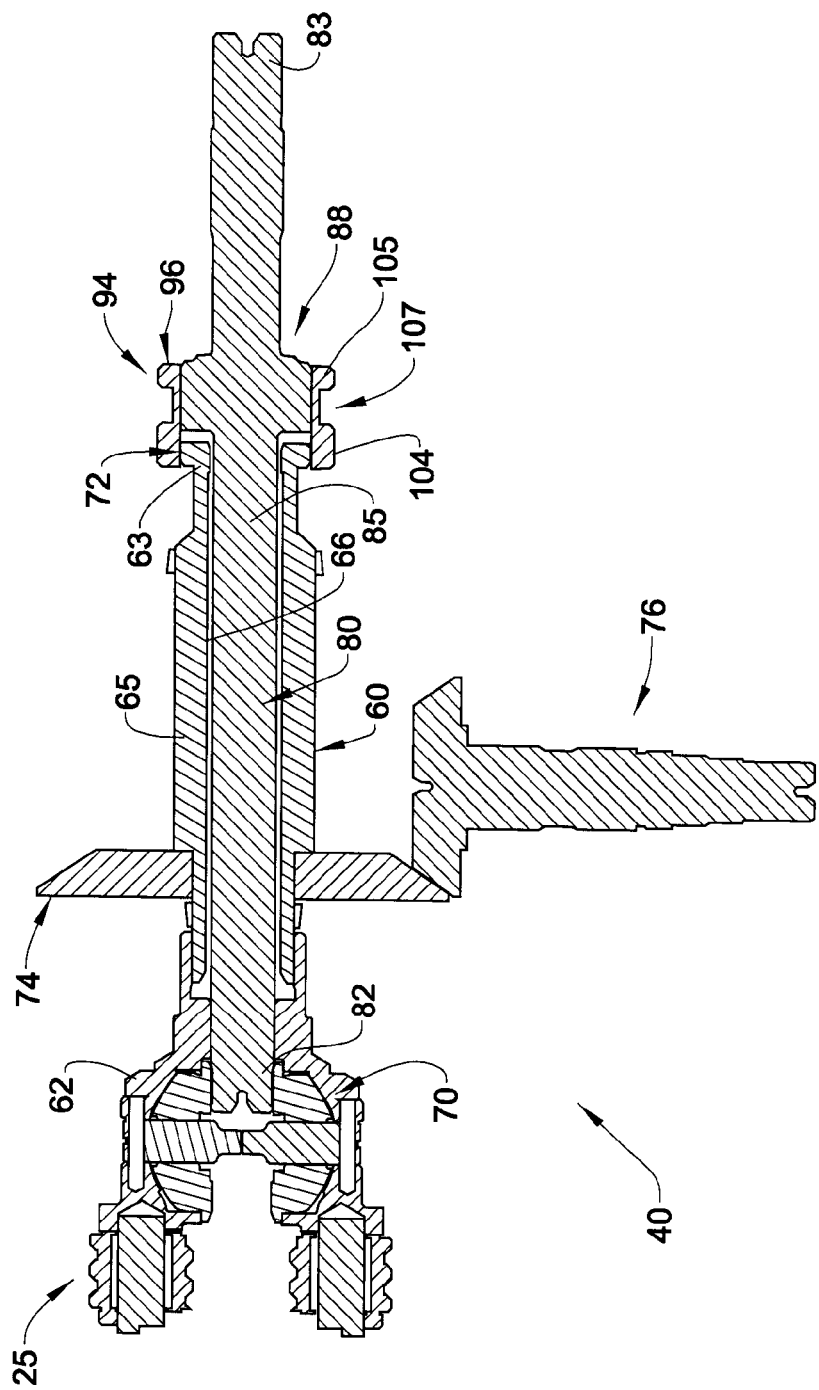
FIG. 4 depicts a partial, cross-sectional view of the power transfer unit of FIG. 2, taken along line 4-4, showing a locking member in a second position.

In accordance with an exemplary embodiment, a power transfer unit (PTU) 40 is operatively connected between FWD transmission 12 and rear drive module 37 through a prop shaft 43. PTU 40 includes a housing 50 that is connected to FWD transmission 12. As best shown in FIGS. 2-4, PTU 40 includes a rear wheel drive gear shaft 60 that is selectively connected to FWD transmission 12. Rear wheel drive gear shaft 60 includes a first end section 62, a second end section 63 and an intermediate section 65 having a hollow interior 66 extending therebetween. First end section 62 includes a side gear assembly 70 that connects with differential 25. Second end section 63 includes a gear member 72. In addition, a ring gear 74 is mounted to intermediate section 65. Ring gear 74 interfaces with a pinion 76 to drive prop shaft 43 and rear drive module 37.

In further accordance with an exemplary embodiment, PTU 40 includes an intermediate drive shaft (IDS) 80 that is operatively connected to second front half shaft 28. IDS 80 includes a first end portion 82, a second end portion 83 and an intermediate portion 85 extending therebetween. IDS 80 includes a gear element 88 arranged on intermediate portion 85. Gear element 88 selectively interfaces with gear member 72 on rear wheel drive gear shaft 60.

In still further accordance with an exemplary embodiment, PTU 40 includes a locking member 94. In accordance with an aspect of an exemplary embodiment, locking member 94 may take the form of a sliding collar 96 supported on IDS 80. Of course, it should be understood that locking member 94 may take on other forms and could be arranged on other components of PTU 40. Locking member 94 includes a first land 104, a second land 105, and a valley 107 extending therebetween. An actuator assembly 112 includes an actuator housing 114 mounted to PTU housing 50. Actuator assembly 112 includes a motor 116 arranged in actuator housing 114. Motor 116 is operatively connected to locking member 94 through an actuator fork 118.

In accordance with an aspect of an exemplary embodiment, actuator fork 118 selectively shifts locking member 94 from a first position, as shown in FIG. 3, in which IDS 80 rotates independently of rear wheel drive gear shaft 60, and a second position, as shown in FIG. 4, in which rotation of IDS 80 is coupled to rear wheel drive gear shaft 60. In the first position, FWD transmission 12 delivers power, from engine 6, only to first and second front wheels 14 and 15. In the second position, FWD transmission 12 delivers power, from engine 6, to first and second front wheels 14 and 15, and first and second rear wheels 33 and 34 through rear drive module 37.

At this point, it should be understood that the exemplary embodiments describe a system that selectively communicates power from a FWD transmission to a set of rear wheels. The power transfer unit cooperates with the FWD transmission to selectively transfer power. The power transfer unit allows a manufacturer to offer four wheel drive or all-wheel drive as an option for a FWD vehicle. Further, use of the power transfer unit allows for a four or all-wheel drive system without the need for complex drive systems, additional transmissions and the like.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A power transfer unit (PTU) for a front wheel drive (FWD) vehicle comprising:
    a housing;
    a rear wheel drive gear shaft having a first end section configured to be selectively connected to a FWD transmission and a second end section including a gear member;
    an intermediate drive shaft having a first end portion configured to be operatively connected to the FWD transmission, a second end portion configured to be connected to a front axle, and an intermediate portion having a gear element; and
    a locking member mounted to one of the rear wheel drive gear shaft and the intermediate drive shaft, the locking member being selectively shiftable between a first position, wherein the intermediate drive shaft is independent of the rear wheel drive gear shaft, and a second position wherein the gear member is operatively connected to the gear element, selectively coupling rotation of the intermediate drive shaft and the rear wheel drive gear shaft.

2. The PTU according to claim 1, wherein the first end section of the rear wheel drive gear shaft includes a ring gear.

3. The PTU according to claim 2, further comprising: a pinion operatively connected between the ring gear and a rear drive module.

4. The PTU according to claim 1, wherein the rear wheel drive gear shaft includes a hollow intermediate section extending between the first end section and the second end section, the intermediate drive shaft extending through the hollow intermediate section of the rear wheel drive gear shaft.

5. The PTU according to claim 1, wherein the gear element is arranged directly adjacent the gear member.

6. The PTU according to claim 5, wherein the locking member is selectively shiftable from the intermediate drive shaft into engagement with the gear member.

7. The PTU according to claim 1, further comprising: a locking member actuator mounted to the housing and operatively connected to the locking member.

8. A drive system comprising:
    a front wheel drive (FWD) transmission including a first output operatively connected to a first front wheel and a second output; and a power transfer unit (PTU) operatively connected to the FWD transmission, the PTU comprising:
  a housing;
  a rear wheel drive gear shaft having a first end section selectively connected to the FWD transmission, and a second end section including a gear member;
  an intermediate drive shaft having a first end portion operatively connected to the second output, a second end portion connected to a second front axle, and an intermediate portion having a gear element; and
  a locking member mounted to one of the rear wheel drive gear shaft and the intermediate drive shaft, the locking member being selectively shiftable between a first position, wherein the intermediate drive shaft is independent of the rear wheel drive gear shaft, and a second position wherein the gear member is operatively connected to the gear element, selectively coupling rotation of the intermediate drive shaft and the rear wheel drive gear shaft.

9. The drive system according to claim 8, wherein the first end section of the rear wheel drive gear shaft includes a ring gear.

10. The drive system according to claim 9, further comprising: a pinion operatively connected between the ring gear and a rear drive module.

11. The drive system according to claim 8, wherein the rear wheel drive gear shaft includes a hollow intermediate section extending between the first end section and the second end section, the intermediate drive shaft extending through the hollow intermediate section of the rear wheel drive gear shaft.

12. The drive system according to claim 8, wherein the gear element is arranged directly adjacent the gear member.

13. The drive system according to claim 12, wherein the locking member is selectively shiftable from the intermediate drive shaft into engagement with the gear member.

14. The drive system according to claim 8, further comprising: a locking member actuator mounted to the housing and operatively connected to the locking member.

15. A motor vehicle comprising:
  a body;
  an engine supported in the body;
  a drive system including a front wheel drive (FWD) transmission operatively connected to the engine, the FWD transmission including a first output operatively connected to a first front axle and a second output; and
  a power transfer unit (PTU) operatively connected to the FWD transmission, the PTU comprising:
    a housing;
    a rear wheel drive gear shaft having a first end section selectively connected to the FWD transmission, and a second end section including a gear member;
    an intermediate drive shaft having a first end portion operatively connected to the second output, a second end portion connected to a second front axle, and an intermediate portion having a gear element; and
    a locking member is mounted to one of the rear wheel drive gear shaft and the intermediate drive shaft, the locking member being selectively shiftable between a first position, wherein the intermediate drive shaft is independent of the rear wheel drive gear shaft, and a second position wherein the gear member is operatively connected to the gear element, selectively coupling rotation of the intermediate drive shaft and the rear wheel drive gear shaft.

16. The motor vehicle according to claim 15, wherein the first end section of the rear wheel drive gear shaft includes a ring gear.

17. The motor vehicle according to claim 16, further comprising: a pinion operatively connected between the ring gear and a rear drive module.

18. The motor vehicle according to claim 15, further comprising: a locking member actuator mounted to the housing and operatively connected to the locking member.

19. The motor vehicle according to claim 15, wherein the gear element is arranged directly adjacent the gear member.

20. The motor vehicle according to claim 15, wherein the rear wheel drive gear shaft includes a hollow intermediate section extending between the first end section and the second end section, the intermediate drive shaft extending through the hollow intermediate section of the rear wheel drive gear shaft.

* * * * *